(12) United States Patent
Bansal et al.

(10) Patent No.: US 12,252,246 B2
(45) Date of Patent: Mar. 18, 2025

(54) WING ASSEMBLY FOR AN AIRCRAFT

(71) Applicant: Lilium eAircraft GmbH, Wessling (DE)

(72) Inventors: Amar Bansal, Munich (DE); Daniel Wiegand, Munich (DE); Andreas Möbius, Wessling (DE); Sébastien Vermeiren, Munich (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 17/673,489

(22) Filed: Feb. 16, 2022

(65) Prior Publication Data

US 2022/0266979 A1 Aug. 25, 2022

(30) Foreign Application Priority Data

Feb. 19, 2021 (EP) ..................................... 21158176
Feb. 19, 2021 (EP) ..................................... 21158264

(Continued)

(51) Int. Cl.
*B64C 3/32* (2006.01)
*B64C 3/48* (2006.01)
(Continued)

(52) U.S. Cl.
CPC ................. *B64C 3/32* (2013.01); *B64C 3/48* (2013.01); *B64D 27/12* (2013.01); *B64D 29/02* (2013.01)

(58) Field of Classification Search
CPC .... B64C 3/32; B64C 3/48; B64C 9/38; B64C 11/001; B64C 39/12; B64D 27/12; B64D 29/02; B64D 27/02
See application file for complete search history.

(56) References Cited

U.S. PATENT DOCUMENTS 2,964,264 A * 12/1960 Multhopp ............. B64C 23/005
244/12.4
3,179,354 A 4/1965 Alvarez-Calderon
(Continued)

FOREIGN PATENT DOCUMENTS

CN 108688803 A * 10/2018 ............. B64C 11/46
CN 110254706 A * 9/2019
(Continued)

OTHER PUBLICATIONS

Anonymous "An introduction to the Lilium Jet". Internet Citation, May 19, 2019 (May 19, 2019), XP002803786.
(Continued)

*Primary Examiner* — Joshua J Michener
*Assistant Examiner* — Cindi M Curry
(74) *Attorney, Agent, or Firm* — Meunier Carlin & Curfman LLC

(57) ABSTRACT

Disclosed is a wing assembly, the wing assembly defining a direction of flow with respect to which the wing assembly is configured to create lift for an aircraft, comprising a main section configured to be mounted to a fuselage to extend from the fuselage in an extension direction of the wing; and a plurality of flap sections each with a body part, which are mounted to the main section in a pivotable manner to be individually pivotable around a pivot axis over a range of angular orientations including a horizontal orientation in which the body part of the flap section is substantially aligned with the main section to form an elongate and substantially continuous cross-section; and a vertical orientation in which the flap section is angled downwards with respect to the main section. An aircraft equipped with at least one pair of such wing assemblies is also described.

9 Claims, 3 Drawing Sheets

(30) Foreign Application Priority Data

Figure 1:
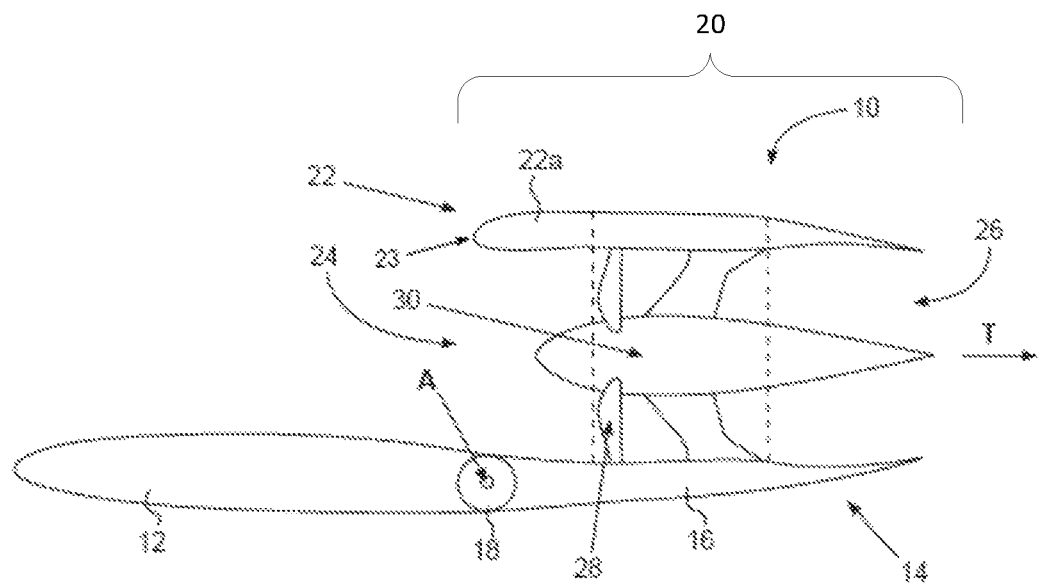

Mar. 5, 2021 (EP) .................................... 21161129
Feb. 1, 2022 (WO) ................ PCT/EP2022/052300

(51) Int. Cl.
*B64D 27/12* (2006.01)
*B64D 29/02* (2006.01)

(56) References Cited

U.S. PATENT DOCUMENTS

| | | | |
|---|---|---|---|
| 5,001,704 | A | 3/1991 | Narup |
| 5,244,167 | A * | 9/1993 | Turk .................. B64C 19/00 244/23 B |
| 6,133,846 | A | 10/2000 | Birkedahl |
| 10,737,797 | B2 * | 8/2020 | Murrow ................ B64D 31/06 |
| 10,787,254 | B1 * | 9/2020 | Chen ..................... B64C 9/12 |
| 11,597,509 | B1 * | 3/2023 | Alfaro ............... B64C 29/0025 |
| 2007/0246610 | A1 | 10/2007 | Rath et al. |
| 2009/0069956 | A1 | 3/2009 | Taya et al. |
| 2013/0013116 | A1 | 1/2013 | Mancuso |
| 2013/0094353 | A1 | 4/2013 | Monroe et al. |
| 2015/0021983 | A1 | 1/2015 | Karimi et al. |
| 2015/0029902 | A1 | 1/2015 | Tischler et al. |
| 2017/0043862 | A1 | 2/2017 | Lippincott |
| 2017/0203839 | A1 * | 7/2017 | Giannini ............... B64D 27/24 |
| 2017/0343357 | A1 | 11/2017 | Mere |
| 2017/0355449 | A1 | 12/2017 | Bapat et al. |
| 2018/0022444 | A1 | 1/2018 | Nakagawa et al. |
| 2018/0113836 | A1 | 4/2018 | Kirata |
| 2018/0362146 | A1 | 12/2018 | Klein et al. |
| 2019/0217937 | A1 | 7/2019 | Wiegand |
| 2019/0291863 | A1 | 9/2019 | Lyasoff et al. |
| 2019/0334741 | A1 | 10/2019 | Dormiani et al. |
| 2020/0017233 | A1 | 1/2020 | Requier et al. |
| 2020/0031454 | A1 | 1/2020 | Wilkens |
| 2020/0125858 | A1 | 4/2020 | Bauer et al. |
| 2020/0164995 | A1 | 5/2020 | Lovering et al. |
| 2020/0301446 | A1 | 9/2020 | Leong |
| 2020/0346747 | A1 | 11/2020 | Lukaczyk et al. |
| 2022/0281594 | A1 * | 9/2022 | Ochoa De Eribe Martínez ......... B64D 33/04 |

FOREIGN PATENT DOCUMENTS

| | | |
|---|---|---|
| CN | 111 268 120 A | 6/2020 |
| DE | 10 2015 207 445 A1 | 10/2016 |
| EP | 3 254 960 A1 | 12/2017 |
| GB | 720 394 A | 12/1954 |
| WO | 2017/200610 A1 | 11/2017 |
| WO | 2019006469 A1 | 1/2019 |
| WO | 2020188604 A2 | 9/2020 |

OTHER PUBLICATIONS

European Search Report for EP 21 158 176.4. Mailed Aug. 16, 2021. 22 pages.
European Search Report for EP 21 158 264.8. Mailed Nov. 10, 2021. 29 pages.
European Search Report for EP 21 161 129.8 mailed Aug. 5, 2021. 26 pages.
International Search Report and Written Opinion issued for Application No. PCT/EP2022/052300, dated May 12, 2022.
International Search Report and Written Opinion issued for Application No. PCT/EP2022/052644 dated Jun. 20, 2022.
International Search Report and Written Opinion issued for Application No. PCT/EP2022/052571, dated Jun. 23, 2022.
Office action received in U.S. Appl. No. 17/673,342, dated Sep. 18, 2023.
Office Action issued for U.S. Appl. No. 17/673,342, dated Mar. 25, 2024.
Non-Final Office Action in connection to U.S. Appl. No. 17/670,852, dated Sep. 17, 2024.
Office Action in connection to U.S. Appl. No. 17/670,852, dated Sep. 17, 2024.
Office Action in connection to U.S. Appl. No. 17/673,342, dated Oct. 1, 2024.

* cited by examiner

WING ASSEMBLY FOR AN AIRCRAFT

The present invention generally relates to wing assemblies for aircrafts with a fuselage and at least one pair of wings, wherein the wing assembly defines a direction of flow with respect to which the wing assembly is configured to create lift for the aircraft. Furthermore, the invention also relates to an aircraft, comprising a fuselage and at least one pair of such wing assemblies.

Aircrafts which rely on wings for creating lift, as opposed to for example helicopters, in addition to said lift creating wing surfaces also require control surfaces by means of which together with the thrust provided by the engines of the aircraft, the horizontal velocity, vertical velocity and attitude of the aircraft can be controlled in compliance with inputs provided by a pilot within an authorized operational range of the aircraft. In order to be able to perform said control functions, actuators are required in the aircraft, which can provoke variations of forces and moments acting on the aircraft, hence modifying its velocity or attitude.

One of the main technical challenges in designing and creating new types of aircrafts is to find the best possible combination of actuators, lift-creating surfaces, control surfaces and engines in order to fulfill these functions. In order to find the best possible combination of parameters of said components, while keeping in mind the intended performance of the aircraft in terms of maximum and cruise velocity, range, maximum payload, fuel or energy consumption etc. at least some of the following criteria can be optimized: number of actuators, complexity of the actuators and of their control system, safety margin, mass, etc.

While these principle considerations have to be made for all types of aircrafts, aircrafts with vertical takeoff and landing (VTOL) capability require additional functionalities in order to be able to be operated in a hovering configuration as well as to make the transition between hover and cruise flight, i.e. substantially vertical and substantially horizontal flight.

Several different approaches have been taken in order to provide VTOL capability together with controllability of the respective aircrafts in horizontal flight mode. For example, aircrafts with two bespoke thrust systems have been suggested, wherein one of the thrust systems provides vertical thrust for hovering and lift in general, while the second thrust system provides for propulsion in cruise flight. However, providing a dual thrust system adds weight and complexity to the respective aircraft. Secondly, VTOL aircrafts are known, in which the thrust unit is rotated between a hovering position and a cruise flight position without rotating any additional part of the wing it is attached to. Even though this design does away with the necessity and disadvantages of providing two thrust systems, it nevertheless does not make use of the additional possible lift, which might be provided by rotatable lift surfaces integrated with the thrust units. Lastly, VTOL aircrafts have been suggested, in which whole wings can be rotated between a hovering and a cruise flight configuration, including thrust units attached thereto. However, rotating entire wings requires additional control surfaces to be implemented to be able to control the aircraft in cruise flight mode when the wings and the thrust units themselves are oriented in a dedicated cruise flight position.

Therefore, there is still potential for improvements in the design of wing assemblies for such aircrafts, in which lift surfaces, control surfaces and thrust providing engines can be integrated in an optimized manner for providing a reliable, lightweight and highly precise integrated lift, control and propulsion system.

For this purpose, according to a first aspect of the present invention, a wing assembly for an aircraft with a fuselage and at least one pair of wings is proposed, wherein the wing assembly defines a direction of flow with respect to which the wing assembly is configured to create lift for the aircraft, comprising a main section, which is configured to be mounted to the fuselage in a fixed manner so as to extend from the fuselage in an extension direction of the wing, and a plurality of flap sections, each with a body part, which are mounted to the main section in a pivotable manner so as to be individually pivotable around a pivot axis by means of a pivoting means over a range of angular orientations including a horizontal orientation, in which the body part of the flap section is substantially aligned with the main section to form an elongate and substantially continuous cross-section, and a vertical orientation, in which the flap section is angled downwards with respect to the main section, wherein the flap sections each comprise a single ducted fan engine with a cowling, an air inlet and an air outlet, which in operation is configured to produce thrust in a predetermined thrust value range, wherein further each ducted fan engine is formed in an integral manner with the body part of its corresponding flap section, such that said body part constitutes a lower section of the cowling of the ducted fan engine.

According to said first aspect, a plurality of individually controllable flap sections are provided at a wing assembly for an aircraft, which can be pivoted or tilted with respect to their angle relative to the fixed main section of the wing assembly, and wherein each of the flap section is provided with a single ducted fan engine, such that a highly integrated wing assembly is provided, in which vectoring of thrust is enabled due to the variable angle between the flap sections and thus the propulsion engines and the fixed main section and thus the fuselage of the aircraft, wherein the flap sections also serve as control surfaces and contribute to the lift of the aircraft in particular in their horizontal orientation. It shall be noted at this point that the direction of flow defined for the present wing assembly substantially corresponds to a horizontal flight direction of the corresponding aircraft. By means of providing a plurality of flap sections, each equipped with only a single individually controllable ducted fan engine, a highly granular control of thrust vectoring among the plurality of ducted fan engines is enabled as well as concerning control and lift surfaces of the wing assembly.

According to a second aspect, the present invention relates to a wing assembly for an aircraft with a fuselage and at least one pair of wings, the wing assembly defining a direction of flow with respect to which the wing assembly is configured to create lift for the aircraft, comprising a main section, which is configured to be mounted to the fuselage in a fixed manner so as to extend from the fuselage in an extension direction of the wing, at least one flap section with a body part, which is mounted to the main section in a pivotable manner so as to be pivotable around a pivot axis by means of a pivoting means over a range of angular orientations including a horizontal orientation, in which the body part of the flap section is substantially aligned with the main section to form an elongate and substantially continuous cross-section and a vertical orientation, in which the flap section is angled downwards with respect to the main section, wherein the at least one flap section comprises at least one ducted fan engine with a cowling, an air inlet and an air outlet, which in operation is configured to produce thrust in a predetermined thrust value range, wherein the at least one ducted fan engine is formed in an integral manner with the body part of the flap section such that said body part constitutes a lower section of the cowling of the at least one ducted fan engine, wherein operational conditions of the wing assembly include the current angular orientation of the at least one flap section and the thrust currently produced by the at least one ducted fan engine, and wherein the main section and the at least one flap section are configured such that at least in a range of operational conditions of the wing assembly, the at least one flap section produces at least about 40% of the lift the wing assembly. In further embodiments, the at least one flap section may also produce at least about 50%, 60% or 70% of the lift the wing assembly.

According to the second aspect of the present invention, a wing assembly is proposed, in which at least in a certain range of operational conditions which include at least the current angular orientation of the at least one flap section and the thrust currently produced by the at least one ducted fan engine, the at least one flap unit with its embedded at least one ducted fan engine can act not only as sole control and propulsion element of the wing assembly, but also as a substantial or even primary lifting surface. Thus, all necessary forces and moments required for control and maneuverability in the wing assembly according to the present invention can be generated through a combination of propulsive thrust vectoring by means of a dedicated actuator and aerodynamic forces and moments with the corresponding assembly also at least in some operational ranges contributing substantial lift.

According to both aspects of the present invention, at least one ducted fan is made pivotable/tiltable around an axis, which is substantially perpendicular to the axis of rotation of its rotor, which enables to orient and control its thrust vector relative to the main section of the wing assembly and thus the aircraft structure, enhancing the ability to control the aircraft attitude. As the at least one flap section is tilted around its pivot axis, the aerodynamic lift created by the flap section is modified as well. Thus, the action of tilting hence acts on both the thrust vector and the lift vector as well as on the drag magnitude. This, combined with the ability to control and adjust the absolute value of the thrust, results in a significantly enhanced ability to control the aircraft with such a combined assembly.

While in the wing assembly according to the second aspect of the present invention, grouping clusters of two or more ducted fans on a single flap section is of course possible, the general inventive ideas of the first and second aspects of the invention may also be combined in a beneficial manner if in the wing assembly according to the second aspect, a plurality of flap sections are provided, which are each individually pivotable and each comprise only a single ducted fan engine.

It should also be noted that according to both aspects of the present invention, the direction of the pivot axis of the at least one flap section may substantially correspond to the extension direction of the wing.

While the at least one flap section with its body part, which in particular orientations serves as an elongation of the cross-section of the main section of the wing assembly, will create lift in horizontal flight of the aircraft equipped with the wing assembly according to invention in any case, in order to further enhance the lifting performance of the integrated flap sections, the upper section of the cowling and/or the side panels of the at least one ducted fan engine with the at least one flap section in horizontal orientation may be formed with such a cross-section in the direction of flow of the aircraft that said sections of the flap/engine assembly also produce lift during operation of the engine. Thus designing additional structural elements associated with the ducted fan engine to produce lift in addition to the body part of the corresponding flap section may contribute to the at least one flap section producing at least about 40% of the lift of the wing assembly in a certain range of operational conditions.

In particular, the upper section of the cowling in a cross section in the direction of flow of the wing assembly may be formed with a primarily convex curvature, preferably comprising one half of a cambered airfoil profile. Said profile may or may not be reflexed. Such a shape is optimized for minimum inlet distortion in hovering conditions and for maximum lift in cruise conditions.

Additionally or alternatively, the radius of a leading edge nose of the upper section of the cowling normalized by its chord line length is between 1.8% and 5%, preferably about 2%. Such a choice of the radius of the leading edge nose of the upper section of the cowling also contributes to minimizing inlet distortion in hovering conditions. Also, the chord line length may typically range from 600 mm to 900 mm and can preferably be about 780 mm.

Alternatively or additionally, in a plan view of the wing assembly with the at least one flap section in horizontal orientation, the at least one flap section may form at least about 40% of the total lifting surface. Herein, the relevant planform of the wing assembly may be defined to either extend to the transition between the wing assembly and the fuselage of the aircraft or also to the centerline of the aircraft.

Furthermore, the present invention relates to an aircraft, comprising a fuselage, at least one pair of wings according to the first and/or second aspect of the present invention as well as a flight control unit for controlling the angular orientations of the flap sections as well as the thrust output of the ducted fan engines. Said aircraft may in particular have VTOL capabilities as discussed above.

In particular, an aircraft according to the present invention may comprise at least two pairs of wing assemblies, wherein the main section and the at least one flap section of the at least one pair of wings according to the first and/or second aspect of the present invention are configured such that at least in a range of operation conditions of the wing assembly, the flap sections of said pair of wing assemblies produce at least about 40% of the total lift of all the wings of the aircraft.

In one particular embodiment, said aircraft may comprise two pairs of wing assemblies according to the first and/or second aspect of the present invention with two different wingspans, wherein preferably in a horizontal flight direction of the aircraft, the pair of wings with the lower wing span is mounted in front of the other pair of wings, such that said aircraft displays a configuration with a main pair of wings and a pair of canard wings.

In said embodiment, the flap sections of the main wings may for example constitute between 30 and 50% of the total lifting surface of said main wings, in particular about 35%, wherein the flap sections of the canard wings may constitute between 50% and 70% of the total lifting surface of said canard wings, in particular about 61%. Alternatively or additionally, under normal, trimmed cruise conditions of the aircraft, due to the above-discussed additional lift provided by the integration of additional lifting surfaces in the flap/engine assemblies, said flap sections of the main wings may contribute between about 45 and 60% of the total lift of the main wings, in particular about 49% and/or the flap sections of the canard wings may contribute between 65 and 85% of the total lift of the canard wings, in particular about 77%.

Figure 2:
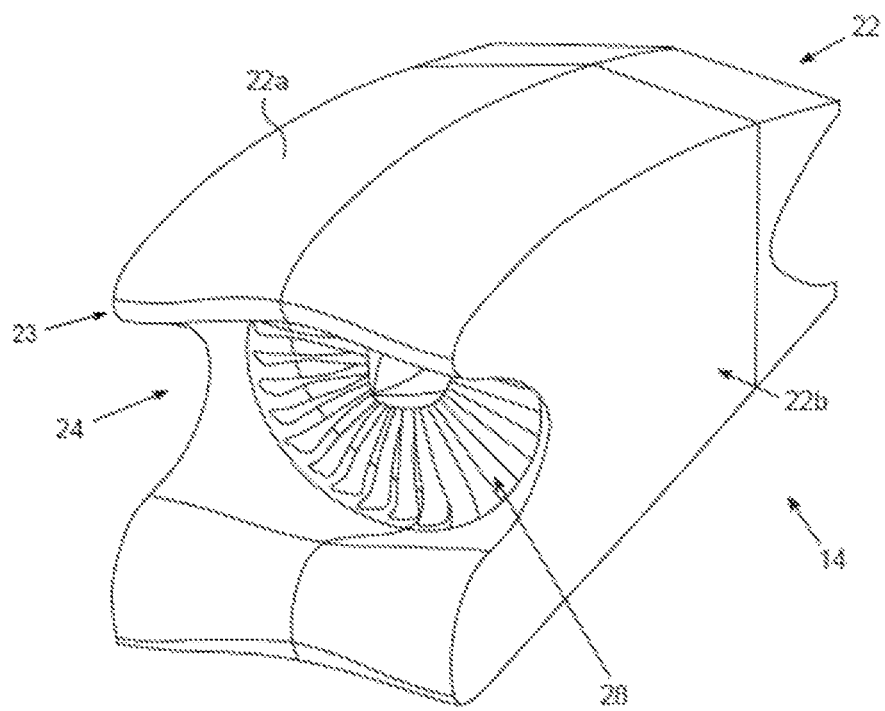
Figure 3:
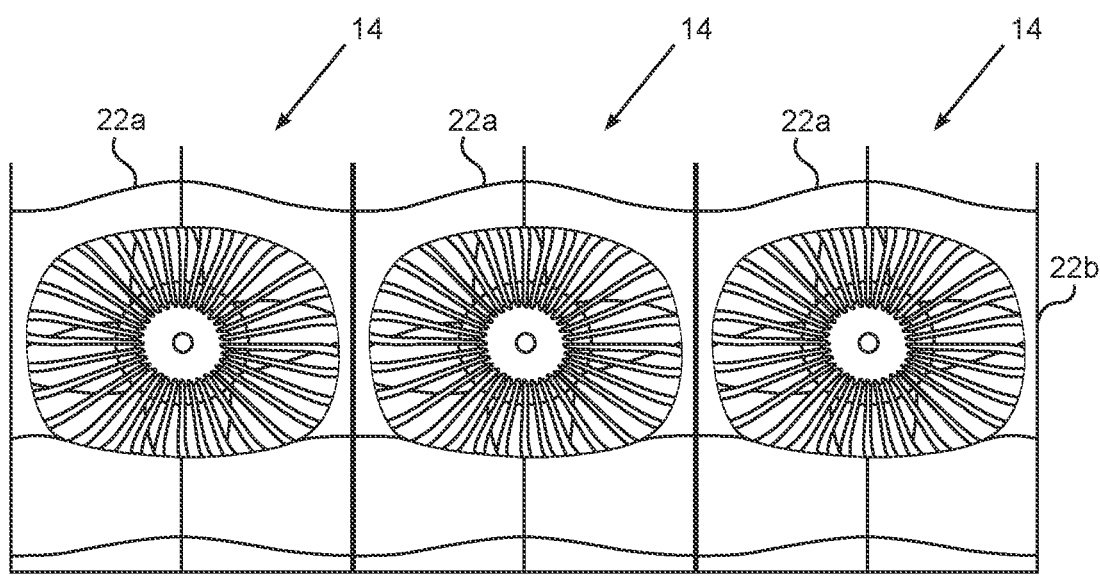
Figure 4:
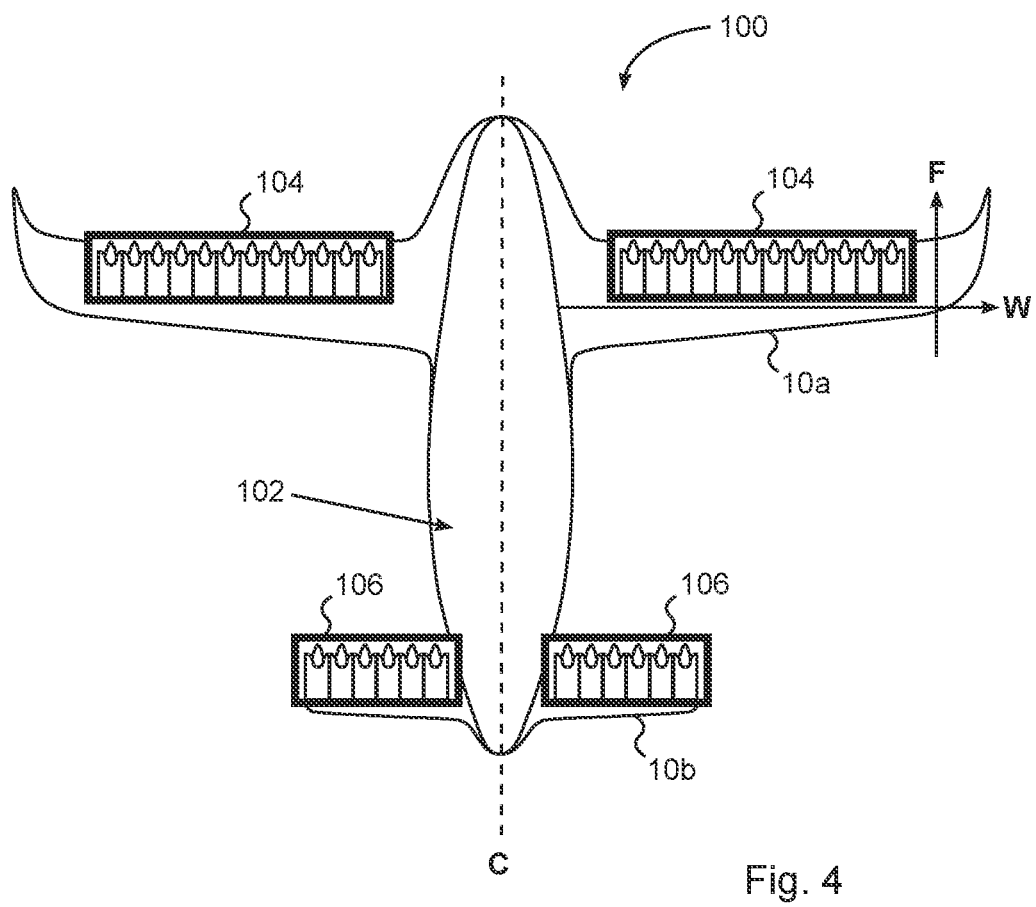
Figure 5:
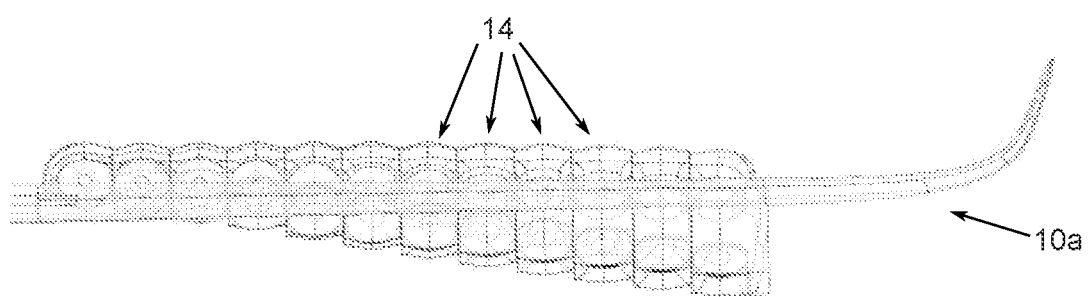
Figure 6:
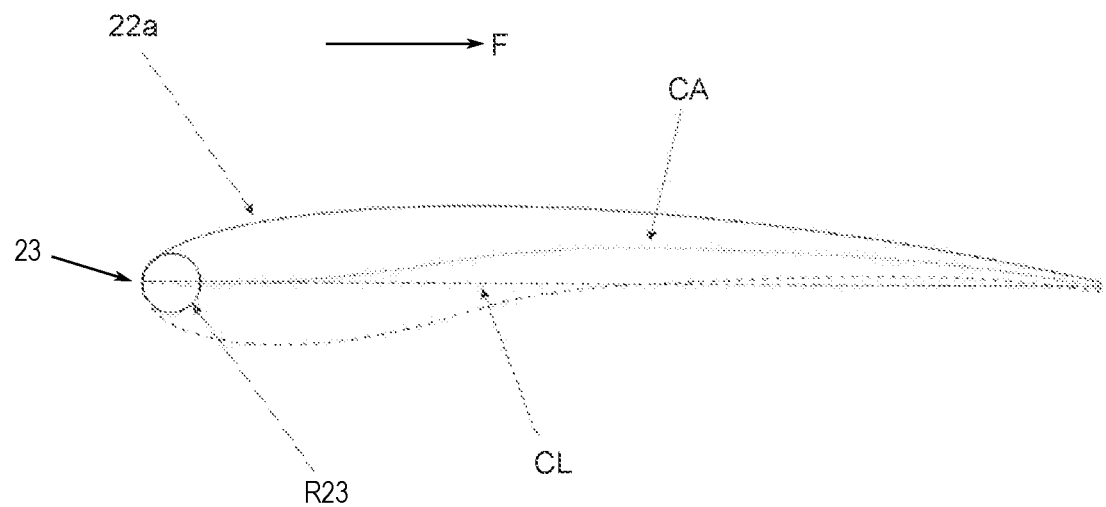

Further features and advantages of the present invention will become even clearer from the following description of embodiments thereof, when taken together with the accompanying drawings, which show in particular:

FIG. 1 a cross-section view of a wing assembly according to the present invention;

FIG. 2 an isometric view of a single integrated flap unit of a wing assembly according to the invention;

FIG. 3 a front view of three such integrated flap units;

FIG. 4 a plan view of an aircraft according to the invention with two pairs of wings;

FIG. 5 a front view of a wing assembly with a plurality of flap units in different angular orientations; and FIG. 6 a schematic cross-section of the upper cowling of the ducted fan engine of FIG. 1.

In FIG. 1, a wing assembly according to the present invention is shown in a cross-section view and generally denoted with reference numeral 10. Said wing assembly comprises a main section 12, which is configured to be mounted to the fuselage of an aircraft in a fixed manner so as to extend from the fuselage in an extension direction W of the wing assembly 10, which is for example shown in FIG. 4. The wing assembly 10 defines a direction of flow F with respect to which it is configured to create lift for the aircraft in horizontal flight.

Furthermore, the wing assembly 10 comprises a flap section 14 with a body part 16, which is mounted to the main section 12 of the wing assembly 10 in a pivotable manner so as to be pivotable around a pivot axis A by means of a pivoting means 18, which is shown only schematically in FIG. 1 and may for example be embodied by a servo motor.

In FIG. 1, the flap section 14 is shown in a horizontal orientation, in which its body part 16 is substantially aligned with the main section 12 of the wing assembly 10 in order to form an elongate and substantially continuous cross-section. The flap section 14 may be pivotable around the pivot axis A over a range of for example 90° such that it can be angled downwards into a vertical orientation, in which the main section 12 and the body part 16 of the flap section 14 are substantially perpendicular to one another.

The flap section 14 further comprises a ducted fan engine 20 with a cowling 22, a leading edge nose 23, an air inlet 24, an air outlet 26, a rotatable rotor 28 and a fixed stator 30 which during operation by means of rotation of the rotor 28 produces thrust along the thrust axis T.

It shall further be pointed out that while the ducted fan engine 20 is formed in an integral manner with the body part 16 of the flap section 14 such that said body part 16 constitutes a lower section of the cowling 22 of the ducted fan 20, the upper section 22a of the cowling is also formed with such a cross-section in the direction of flow F of the wing assembly 10 that it also contributes to the lift provided by the flap section 14.

By angling the flap section 14 with respect to the main section 12 around the pivot axis A, the flap section 14 may act as a control surface of the wing assembly 10, while simultaneously the thrust vector T is rotated and the lift provided by the flap section 14 is varied as well. Thus, by integrating the pivotable flap section 14 with the ducted fan engine 20, said flap section 14 acts as an aerodynamic control surface at the same time as being able to vector thrust, thus providing two degrees of freedom within a single unit. With the flap section 14 furthermore contributing a substantial percentage of the lifting surface of the wing assembly 10, vastly improved maneuverability and higher flight speed is made possible compared to conventional designs.

Consequently, the flap section 14 produces a significant proportion of the total aircraft lift in addition to providing thrust magnitude and thrust vectoring that can be altered individually. Said flap section 14 is thus utilized in all flight phases to reduce thrust demand on the engine at low flight speeds or to allow payloads to be increased. As can further be seen from FIGS. 2 and 3 discussed below, the design of air inlet 24 of the ducted fan engine 20 together with the geometrical properties of the remaining components of the flap section 14 allows for clean inlet conditions at all flap section angles.

In said FIGS. 2 and 3, a single flap section 14 with an integrated ducted fan engine 20 and three such flap sections 14 are shown in an isometric view and in a front view, respectively. It can be seen that each of the flap sections 14 carries only a single ducted fan engine 20, while in other modifications of the shown embodiment, multiple ducted fan engines might be integrated in a single flap section. It can furthermore be seen from FIGS. 2 and 3 how the cowling 22 of the ducted fan engine 20 is shaped in its upper section 22a as well as in the section of the side panels 22b of the ducted fan engine 20 in an aerodynamic manner with a cross-section, which will also contribute to producing lift with the flap section 14 during operation of the engine 20.

Furthermore, in FIG. 4, an aircraft 100 with a fuselage 102 and two pairs of wings 10a and 10b is shown in a plan view, wherein each of the wings 10a and 10b is equipped with flap sections as discussed above, and wherein the first pair of wings 10a serve as main wings, while the second pair of wings 10b with a shorter wingspan serve as canard wings located in front of the main wings 10a.

Therein, the overall planform of the main wings 10a is chosen such that the flap sections contribute to about 35% of the overall main wing planform as indicated by boxes 104, whereas the flap sections of the canard wings 10b contribute to about 61% of the total planform surface of the canard wings 10b as indicated by boxes 106. The respective wing planforms are defined to extend toward the centerline C of the aircraft 100.

Due to the additional lift contributed by the specific design of the flap sections 14 provided to the wings 10a and 10b as discussed above, in nominal, trimmed cruise condition of the aircraft 100, the flap sections of the main wings 10a will contribute about 49% of the total lift of said main wings 10a, while the flap sections of the canard wings 10b will contribute about 77% of the total lift produced by the canard wings 10b. Thus, the flap sections of the main wings 10a and canard wings 10b combined will produce more than 50% of the overall lift of the aircraft 100 under said conditions.

Additionally, in FIG. 5, one of the main wings 10a is shown in a front view with its plurality of flap units 14 all in different angular orientations, in order to demonstrate their ability to independently pivot over a range of angular orientations.

Lastly, in FIG. 6, a schematic cross-section in the direction of flow F of the upper section 22a of the cowling 22 of the ducted fan engine 20 of FIG. 1 is shown, which provides for minimum inlet distortion of air sucked into the engine 20 in hovering configuration as well as maximum lift in cruise configuration of the respective flap unit 14. In particular, the upper section 22a of the cowling 22 is formed with a primarily convex curvature as one half of a cambered airfoil profile with camber line CA, wherein the dashed line in FIG. 6 represents the theoretical lower half of said profile.

Furthermore, the radius R23 of the leading edge nose 23 of the upper section 22a of the cowling 22 normalized by its chord line length CL is between 1.8% and 5%, preferably about 2%, while typically the chord line length CL of such engines 20 ranges between 600 mm to 900 mm and may in particular be about 780 mm.

The invention claimed is:

1. A wing assembly for an aircraft with a fuselage and at least one pair of wings, the wing assembly defining a direction of flow (F) with respect to which the wing assembly is configured to create lift for the aircraft, comprising:
a main section, which is configured to be mounted to the fuselage in a fixed manner so as to extend from the fuselage in an extension direction (W) of the wing;
a at least one flap section with a body part, which is mounted to the main section in a pivotable manner so as to be pivotable around a pivot axis (A) by means of a pivoting means over a range of angular orientations including:
a horizontal orientation in which the body part of the flap section is substantially aligned with the main section to form an elongate and substantially continuous cross-section; and
a vertical orientation in which the flap section is angled downwards with respect to the main section;
wherein the at least one flap section comprises a plurality of ducted fan engines, each ducted fan engine with a cowling, an air inlet and an air outlet which in operation is configured to produce thrust in a predetermined thrust value range;
wherein each ducted fan engine is formed in an integral manner with the body part of the flap section such that said body part constitutes a lower section of the cowling of the at least one ducted fan engine;
wherein operational conditions of the wing assembly include an angular orientation of the at least one flap section from the range of angular orientations and a thrust value produced by each ducted fan engine from the predetermined thrust value range;
wherein the main section and the at least one flap section are configured such that at least in a range of operational conditions of the wing assembly, the at least one flap section produces at least 40% of the lift of the wing assembly; and
wherein an upper section of the cowling and/or side panels of each ducted fan engine with the at least one flap section in horizontal orientation is formed with a cross section in the direction of flow (F) of the wing assembly such that the upper section of the cowling and/or side panels of the at least one ducted fan engine produces lift during operation of the engine,
wherein the upper section of the cowling having the cross section in the direction of flow (F) of the wing assembly is formed with a primarily convex curvature, comprising one half of a cambered airfoil profile,
wherein each ducted fan engine has a vertical midline, an outer surface of said upper section of the cowling achieving a peak at the vertical midline of each ducted fan engine and falling away in horizontal directions toward each side panel of the ducted fan engine, said outer surface of the upper section of the cowling of each ducted fan engine symmetrical about the vertical midline of each ducted fan engine, and
wherein a radius (R23) of a leading edge nose of an upper section of the cowling normalized by its chord line length (CL) is between 1.8% and 5%, and/or the chord line length (CL) is between 600 mm to 900 mm.

2. The wing assembly according to claim 1, wherein a plurality of flap sections are provided which are each individually pivotable and each comprise a single ducted fan engine.

3. The wing assembly according to claim 1, wherein the direction of the pivot axis (A) of the at least one flap section substantially corresponds to the extension direction (W) of the wing.

4. The wing assembly according to claim 1, wherein in a plan view of the wing assembly with the at least one flap section in horizontal orientation, the at least one flap section forms at least 40% of the total lifting surface.

5. An aircraft, comprising a fuselage, at least one pair of wing assemblies according to claim 2, and a flight control unit for controlling the angular orientations of the flap sections and the thrust output of the ducted fan engines.

6. The aircraft according to claim 5,
comprising at least two pairs of wing assemblies, wherein the main section and the at least one flap section of the at least one pair of wings assemblies are configured such that at least in a range of operational conditions of the wing assembly, the flap sections of said pair of wing assemblies produce at least 40% of the total lift of all the wings of the aircraft.

7. The aircraft according to claim 5, comprising two pairs of wing assemblies with different wingspans, wherein in a horizontal flight direction of the aircraft the pair of wings with lower wingspan is mounted in front of the other pair of wings.

8. The aircraft according to claim 5, wherein the flap sections of a first pair of wings comprise between 30 and 50% of the total lifting surface of said first pair of wings, wherein the flap sections of a second pair of wings comprise between 50% and 70% of the total lifting surface of said second pair of wings, and/or wherein, under normal, trimmed cruise conditions of the aircraft, said flap sections of the first pair of wings contribute between 45 and 60% of the total lift of the first pair of wings, and/or the flap sections of the second pair of wings contribute between 65 and 85% of the total lift of the second pair of wings.

9. The aircraft according to claim 8, wherein the first pair of wings comprise main wings and the second pair of wings comprise canard wings.

* * * * *